UNITED STATES PATENT OFFICE.

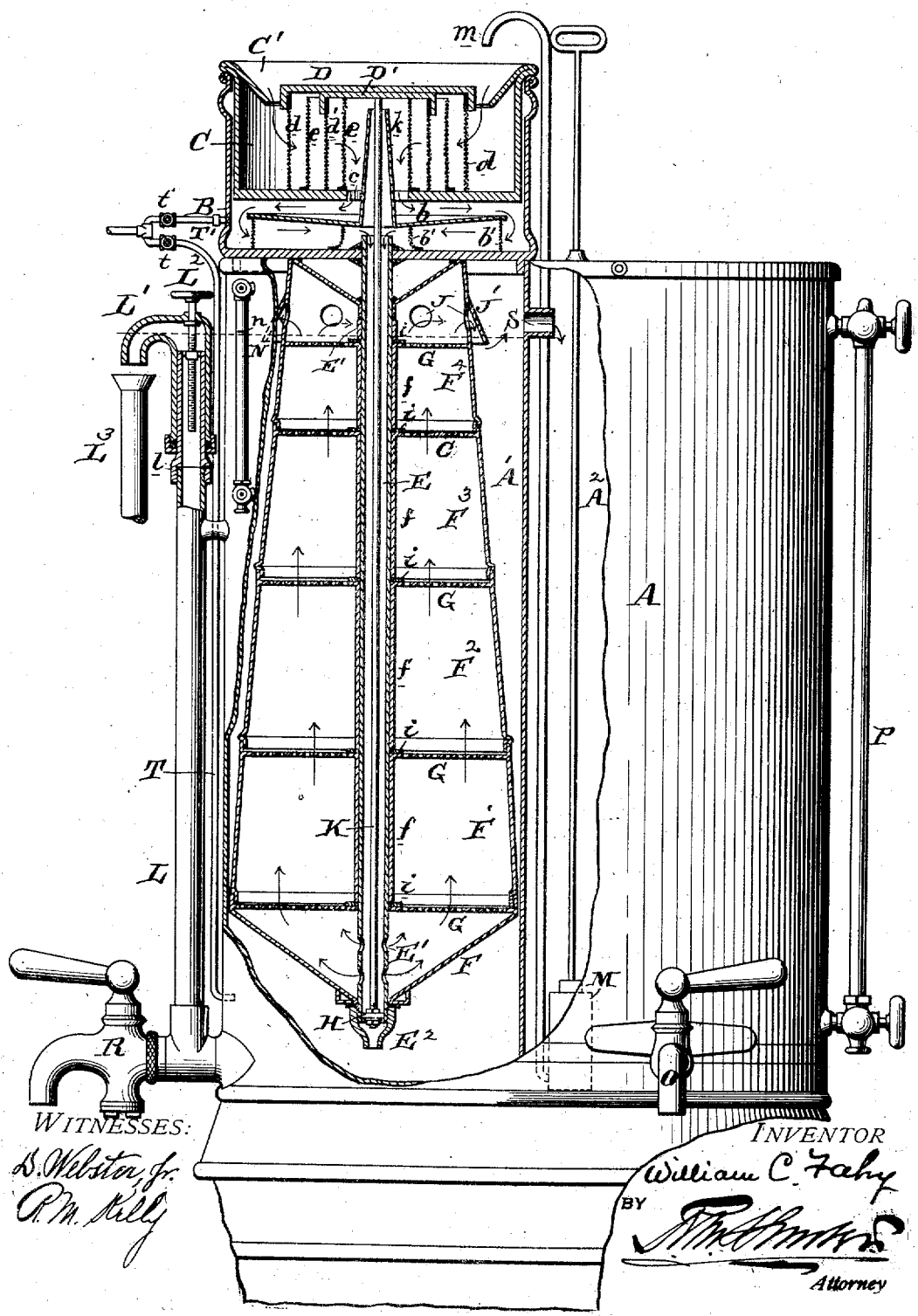

WILLIAM C. FAHY, OF PHILADELPHIA, PENNSYLVANIA.

OIL-FILTER.

No. 868,257.  Specification of Letters Patent.  Patented Oct. 15, 1907.

Application filed May 15, 1906. Serial No. 316,973.

*To all whom it may concern:*

Be it known that I, WILLIAM C. FAHY, of the city and county of Philadelphia and State of Pennsylvania, have invented an Improvement in Oil-Filters, of which the following is a specification.

My invention has reference to oil filters and consists of certain improvements which are fully set forth in the following specification and shown in the accompanying drawings which form a part thereof.

My invention has for its object the purification of oil from operating machinery whereby it may be used repeatedly and with a minimum of waste, and more specifically, my object is to secure the purification in a speedy, efficient and inexpensive manner.

Among the chief objects of my invention is, first, to filter the mixture of oil, and impurities which has dripped from machinery or come from other sources and separating the oil from the water in continuous operation, whereby the impure oil can be introduced into the purifier and the purified oil and water separated and decanted separately from each other automatically and continuously, secondly, to provide a construction of filter in which the solid impurities removed from the oil will not impair to a practical extent the process of purification.

My invention embodies a tank containing water and a series of filtering pans having perforated diaphragms through which the oil is required to successively pass while rising so that the oil is dissociated from the solid impurities and washed by contact with the body of water through which it passes, combined with preliminary screens for separating the oil from solid impurities mechanically before said oil and the finer impurities find their way to the purifying pans in which said finer impurities separate by displacement and gravity.

My invention also embodies means for regulating the overflow for the water, whereby the water level within the tank may be varied to suit the specific gravity of the oil being purified. This permits a less body of oil to float upon the surface of the water before passing to the oil tank than would otherwise result if the filter had been designed for a light oil and then used for a heavy oil. This enables the use of the same column of water for washing or scouring the oil in the case of a heavy oil as with a light oil.

My invention also comprehends many details of construction, which, together with the features above specified, will be better understood by reference to the accompanying drawings in which is shown a sectional elevation of my improved oil filter.

A is the tank and is divided into two chambers A′ and A², the latter receiving and storing the purified oil. The chamber A′ has an overflow pipe L connected to its bottom and provided with an adjustable nozzle L′ made vertically adjustable by a screw L². A stuffing box $l$ prevents leakage of water from the overflow pipe L at its juncture with the nozzle L′. A waste pipe L³ carries off the waste water. This overflow pipe governs the level of the water within the chamber A′ and within the filtering compartments so that the film of oil floating upon said water shall not be greater than required. The bottom of the chamber A′ is also provided with a spigot R for drawing off the water when desired for cleaning.

Resting upon the upper vein of the chamber A′ is a supply tank B from the bottom of which depends a central pipe E having its upper end extended slightly above the bottom of the tank so as to enable the said tank to hold a layer of water on its bottom. Removably suspended within the supply tank B is a receiver C having a conical top C′ and a central opening $c$ at the bottom surrounded by two annular upright screens $e$ $e$.

D D′ are two flanged plates respectively having the downwardly extending annular screens $d$ $d′$ which alternate with the screens $e$ $e$ as shown. These plates D D′ with their screens are removable.

The space between the bottom of the receiver C and tank B is provided with a conical or dish plate $b$ having a central tube $k$ extending upward through the central aperture $c$ to a considerable distance above the bottom of the receiver. Between the conical plate $b$ and the bottom of the tank B are annular screens $b′$, $b′$.

The bottom of the central depending pipe E is provided with holes E′ and a reducing nozzle E² which is provided with a valve H to normally prevent discharging into the chamber A′.

F is a conical bottom pan resting upon the nozzle E² and having at its top a perforated diaphragm G. Resting upon the bottom pan is a pan F′ also having a perforated diaphragm G near its top. Above this is another pan F² and so on as to pans F³ and F⁴, the latter having an upward part which reaches to the bottom of the tank B above the level of the water and oil in the chamber A′. These several pans F, F′, F², F³, F⁴, are all sleeved upon the central pipe and secured thereon by the nozzle E² acting as a retaining vent. To prevent any oil passing around the diaphragm G, packing washers $i$ of rubber or leather are interposed between the sleeves $f$ of one pan and the diaphragm G of the next lower pan.

As shown, all the pans but the bottom one have their shells made conical so as to form frusta with the largest ends at the bottom and these engage by a sleeve joint so as to form a conical tube having series of perforated diaphragms of gradually reduced area. The lowest diaphragm is the largest and the upper one is the smallest and I prefer that the apertures in the lower diaphragm shall be larger than those in the upper diaphragm, and preferably with the holes in the several diaphragms such that they are smaller than those in the diaphragm below and larger than the diaphragm above. However, if desired, these apertures may be made of any other size desired and the pans may be all made alike and cylindrical to reduce cost of construction.

The upper pan $F^4$ has apertures J in its sides through which the oil and water pass into the chamber $A'$. A hood $J'$ may extend from the sides of the pan $F^4$ above the apertures J and dip slightly below the level of the water and oil as shown. The oil may flow through a pipe or aperture S into the receiving tank $A^2$, from which it may be drawn off by a spigot O. A gage P may be used if desired to indicate the level of the oil in the chamber $A^2$. It is not essential that a receiving tank $A^2$ be used as the oil from the aperture may be received in buckets, cans, or conveyed away by pipes, if so desired.

A pump M may be employed for filling oil cans and recirculating the oil through the filter for more perfect purification should it be necessary when the receiving tank is employed. In such case the pump M may be conveniently arranged in the bottom of the oil chamber $A^2$ with the spout $m$ extended up over the receiver C.

A steam jet T controlled by a valve $t$ may be employed to keep the water in the chamber $A'$ at the desired temperature to insure proper gravity of the oil remaining low during its treatment in the filter. I may also employ a similar steam jet $T'$ controlled by a valve $t'$ for the supply tank B below the receiver and this insures the temperature in the receiver and supply tank to be such that congealed oil will be fully liquefied and brought to the proper gravity for purifying treatment. I would point out here that by employment of steam jets great economy of steam results and the cost of construction is greatly less than where heating coils are employed, especially where such coils are provided with a steam trap. In the use of the jets T $T'$ only the smallest opening of the valves is required and all steam is fully utilized.

The piston H has a rod K which extends upward through the pipe E and through the tubular part $k$ and terminates immediately below the plates D $D'$ in the receiver C. When these plates are down to proper position the rod K must be in such position that the piston valve H is below the openings $E'$ and seals the nozzle $E^2$. In this manner accidental opening of the nozzle can be guarded against.

The operation is as follows: The tank $A'$ being filled with water to the level of the dotted line $x$—$x$, the oil, water and accompanying impurities received from the machinery is discharged into the pan C and pass through the concentric screens $e$ $d$ $d'$, leaving behind any coarse refuse that might be contained in the oil. The oil and water then pass down through aperture $c$ upon the plate $b$ which, because of its conical or dish character, contains a body of water and over which the oil flows radially outward thereby being split up and washed. The oil and water flow over the rim of this plate $b$ down upon another body of water in the bottom of the pan B and thence flows inward through the screens $b'$ into the top of the central pipe E. The water oil is thus more or less cleaned and purified before entering the pipe E and consequently its further purification is accomplished without serious clogging of the filter from sediment. Any air liberated may pass from the pipe E and below the plate $b$ upwardly through the tubular part $k$ of the plate and escape through the receiver. The oil and water passes down through the pipe E and emerges at the bottom from the apertures $E'$ into the pan F, thence it passes upward through the perforated diaphragms G of the several pans $F'$ $F^2$ $F^3$ and $F^4$ to the top of the water, then through the apertures J, under the hood $J'$ and upward to the surface of the water and thence through the aperture S into the oil receiving chamber $A^2$. The water that passes into the pipe E and pan F rises with the oil and some of said water passes upward through the diaphragms to the upper pan $F^4$ and other portions thereof pass through the outer joints between the several pans into the chamber $A'$ outside of said filtering pans. The oil in rising is split into fine globules and these are scoured and cleansed by contact with the water. The lighter specific gravity of the oil makes it travel upward through the successive bodies of water below each diaphragm G, the water rising at a very much slower speed. In this way the oil is greatly purified by the time it reaches the surface of the water. As the joints between the several filtering pans are at their bottom, it is evident that the oil cannot escape from said joints, because once it rises into either of the pans it must of necessity all pass through the perforations of the diaphragms. At the top, the oil is caused to float upon the water and in flowing over it becomes still further purified and this is enhanced by the presence of the hood $J'$.

The layer of oil within the chamber $A'$ is shown by the gage N, and the thickness of this layer of oil may be varied by the adjustment of the overflow nozzle $L'$. The gage N should be marked as at $n$ to indicate the level to which the water should be brought by adjustment of the overflow nozzle $L'$. This gage N may be of any suitable construction so long as it will indicate the level of the water and oil, and the marking may be made in any form desired so long as it indicates the proper relation of the level of the water to the level of the overflow whereby only the thinnest layer of oil may be maintained upon the water without the water passing through the oil outlet into the oil chamber $A^2$.

As the water accumulates within the chamber $A'$ it escapes by the overflow pipe $L'$ so that a definite level may be maintained. As the weight of the oil within the chamber $A'$ will cause the actual level of the water therein to be somewhat less than the level of the overflow, it is evident that for oils of different specific gravities the overflow must be adjusted, otherwise, if so fixed for very light oils that only a very thin film of oil will be upon the water within the chamber $A'$, the use of the filter for very heavy and thick oils will induce a very deep layer of oil to remain in the filter thereby reducing its purifying capacity. If, however, the nozzle $L'$ is raised by the adjusting screw $L^2$ to raise the overflow outlet, then the water level within the chamber $A'$ will be correspondingly raised and even the heaviest oils may be made to form only a thin film upon the surface of the water within the chamber This adjustability of the overflow is therefore a ...ry important adjunct to my improved filter, and renders it adapted to filter oils of all specified gravities with the same degree of purification.

To cleanse the filter, I have provided the rod K and piston H, which is normally in the position as shown in the drawing so as to close the nozzle E², but upon raising the rod K to bring the piston H above the apertures E' the contents of the several pans will drain down into the chamber A' through the nozzle E² when the water is drawn off from the chamber by the spigot R. It is evident that if we first draw off the water from the chamber A' before raising the piston H, then upon raising the piston the draining of the pans will be with considerable force and insure them being cleansed to a material degree. When all of the water has been drawn off, the pan B and its attached purifying pans F F' &c may be withdrawn from the chamber and the parts dismantled for thorough cleansing.

I have shown the construction of filter which I have found most practicable as an embodiment of my invention, and though I prefer said construction, I do not confine myself to the details thereof as they may be modified in various ways without departing from the spirit of my invention.

Having now described my invention, what I claim as new and desire to secure by Letters Patent is:—

1. An oil filter having a filtering chamber to contain water through which the oil is required to rise, combined with a steam pipe for treating the impure oil with live steam before it reaches the filtering chamber to thin the oil and separate its grosser impurities, and continuously acting means for admitting into the body of water within the tank a continually flowing minute jet of steam during the purifying of the oil and to keep the oil at a low gravity during filtration.

2. An oil filter having a receiver for receiving impure oil and water, combined with filtering apparatus for purifying the water, and a steam jet for admitting steam to the filter to heat the receiver during the purification of the oil whereby the oil therein may be heated and its gravity lowered so as to separate from its impurities and flow more readily through the filtering apparatus.

3. In a filter, a filtering tank to contain water provided with an oil outlet near its top, combined with a water overflow nozzle having its discharge opening vertically adjustable so as to enable the level of the water in the filtering tank to be varied relatively to the oil outlet, said overflow consisting of a pipe opening from the filtering tank, a vertically adjustable nozzle sleeved upon the pipe, and a screw to raise or lower the nozzle on the pipe.

4. In an oil filter a water chamber having a water overflow pipe and an oil outlet at the normal level of the water, combined with a central pipe extending down to near the bottom of the water chamber, a supply pan above the water chamber from which the central pipe depends, a series of superimposed closed filtering pans surrounding the central pipe the lowermost of said pans receiving oil from the central pipe and the uppermost pan delivering the purified oil upon the top of the water, and means consisting of vertical screens and horizontal water receptacles in the supply pan for giving to the impure oil a preliminary screening and washing before passing into the central pipe.

5. In an oil filter a water chamber having a water overflow pipe and an oil outlet at the normal level of the water, combined with a central pipe extending down to near the bottom of the water chamber, a supply pan above the water chamber from which the central pipe depends and having its bottom below the top of the central pipe and forming a shallow unobstructed chamber containing a layer of water, a series of superimposed closed filtering pans surrounding the central pipe the lowermost of said pans receiving oil from the central pipe and the uppermost pan delivering the purified oil upon the top of the water, and means in the supply pan for giving to the impure oil a preliminary cleansing before passing into the central pipe said means consisting of the dished plate b and one or more annular screens b' below it depending into the water in the bottom of the supply pan and through which the oil is required to pass.

6. In an oil filter a water chamber having a water overflow pipe and an oil outlet at the normal level of the water, combined with a central pipe extending down to near the bottom of the water chamber, a supply pan above the water chamber from which the central pipe depends, a series of superimposed closed filtering pans surrounding the central pipe the lowermost of said pans receiving oil form the central pipe and the uppermost pan delivering the purified oil upon the top of the water, and means in the supply pan for giving to the impure oil a preliminary cleansing before passing into the central pipe and a receiver C fitting into the supply pan and having screens e and central opening c.

7. A filter combined with a receiver consisting of a pan C having a central opening c and upright concentric screens e c, and one or more cover plates having downward cylindrical screens concentric with the screens e e.

8. A filter combined with a receiver pan having a dish shaped plate b over which the oil and water flows and concentric screens b' below the plate, means for sustaining a body of water on the bottom of the pan and above the lower parts of the screens, a central pipe below the plate for receiving the oil and water, and means above the plate b for delivering the oil and water to it near its center.

9. A filter combined with a receiver pan having a dish shaped plate b over which the oil and water flows and concentric screens b' below the plate, means for sustaining a body of water on the bottom of the pan and above the lower parts of the screens, a central pipe below the plate for receiving the oil and water, and means above the plate b for delivering the oil and water to it near its center consisting of a receiver C having the concentric screens c e and one or more cover plates provided with downwardly extending screens concentric with the screens c.

10. In an oil filter a tank to contain water combined with a central pipe for leading oil and water to a distance below the water level, purifying filter pans below the water receiving the oil from the bottom of the central pipe, a supply tank secured to the top of the central pipe, a dish shaped plate b above the central pipe and within the supply tank and also having an upwardly extending vent pipe k, and a receiver within the supply tank and having a central opening c surrounding the vent pipe k.

11. In an oil filter a tank to contain water, combined with a central pipe for leading oil and water to a distance below the water level, purifying filter pans below the water receiving the oil from the bottom of the central pipe, a supply tank secured to the top of the central pipe, a dish shaped plate b above the central pipe and within the supply tank and also having an upwardly extending vent pipe k, a valve to control the flow of the contents of the purifying filter pans into the water tank, and a rod for operating the valve extending upward through the central pipe and vent pipe, and a receiver within the supply tank and having a central opening c surrounding the vent pipe k.

12. In an oil filter, a water tank, a receiving tank having a depending central pipe having two outlets at the bottom, a series of filtering pans arranged one above the other and sleeved upon the central pipe and receiving oil and water from one of the outlets of the central pipe a valve to close the other outlet from the central pipe to the water tank and a rod extending upward through the central pipe to the valve for putting the two outlets into communication whereby the contents of the filtering pans may be drained through the outlets of the central pipe into the water tank.

13. In an oil filter, a water tank, a series of filtering pans therein, a supply pan above the water tank, a depending pipe through which oil and water is supplied to the lowermost filtering pan, a valve for putting said lowermost filtering pan into communication with the pipe or with the water tank, and a rod for operating the valve extending up through the depending pipe.

14. In an oil filter, a water tank, a series of filtering pans therein, a supply pan above the water tank, a depending pipe through which oil and water is supplied to the lowermost filtering pan, a valve for putting said lowermost filtering pan into communication with the pipe or with the water tank, a rod for operating the valve extending up through the depending pipe and a removable screen cap arranged within the supply tank for screening the oil before passing to the depending pipe arranged over the upper end of the valve rod to insure its being normally in position when filtering is occurring.

15. In an oil filter, the water tank having an overflow and an oil outlet, a depending pipe E for oil, surrounding filtering pans F F' F² and F³ to the lowermost of which the pipe E delivers the oil and water, an upper filtering pan F⁴ having outlets J and a hood J' the lower edge of which dips into the water in the tank.

In testimony of which invention, I hereunto set my hand.

WM. C. FAHY.

Witnesses:
R. M. HUNT.
R. M. KELLY.